(12) United States Patent
Berkman et al.

(10) Patent No.: US 6,880,573 B2
(45) Date of Patent: Apr. 19, 2005

(54) FROST FREE VALVE ASSEMBLY

(75) Inventors: Peter Berkman, Highland Park, IL (US); Robert Tripp, Brea, CA (US); Ralph Mieseler, Lombard, IL (US); Igor Alzares, Cicero, IL (US)

(73) Assignee: B & K Industries, Elk Grove Village, IL (US)

(*) Notice: Subject to any disclaimer, the term of this patent is extended or adjusted under 35 U.S.C. 154(b) by 3 days.

(21) Appl. No.: 10/631,372

(22) Filed: Jul. 31, 2003

(65) Prior Publication Data
US 2005/0022882 A1 Feb. 3, 2005

(51) Int. Cl.[7] .......................... E03C 1/10; F16K 15/18
(52) U.S. Cl. ................... 137/614.2; 137/454.5
(58) Field of Search ................ 137/614.2, 454.6, 137/454.5

(56) References Cited
U.S. PATENT DOCUMENTS

| | | | |
|---|---|---|---|
| 4,909,270 A | 3/1990 | Enterante, Sr. et al. | |
| 5,022,429 A | 6/1991 | Rollini et al. | |
| 5,392,805 A | * 2/1995 | Chrysler | 137/218 |
| 5,632,303 A | 5/1997 | Almasy et al. | |
| 5,996,614 A | * 12/1999 | Ashton | 137/454.6 |
| 6,142,172 A | 11/2000 | Shuler et al. | |

* cited by examiner

Primary Examiner—Kevin Lee
(74) Attorney, Agent, or Firm—Harness, Dickey & Pierce, P.L.C.

(57) ABSTRACT

A frost free faucet having a spigot assembly including a drain conduit, a sleeve assembly including an elongated pipe, and a valve assembly. The valve assembly including a ¼ turn valve and a check valve. The ¼ turn valve includes a rotatable disc with an inlet and a stationary disc with a through hole. Each disc is formed of a ceramic material, wherein upon turning the rotatable disc 90 degrees in a first direction the inlet and the through-hole align to an open position and upon turning the rotatable disc 90 degrees in a second direction, the inlet and the through-hole misalign to a closed position.

9 Claims, 7 Drawing Sheets

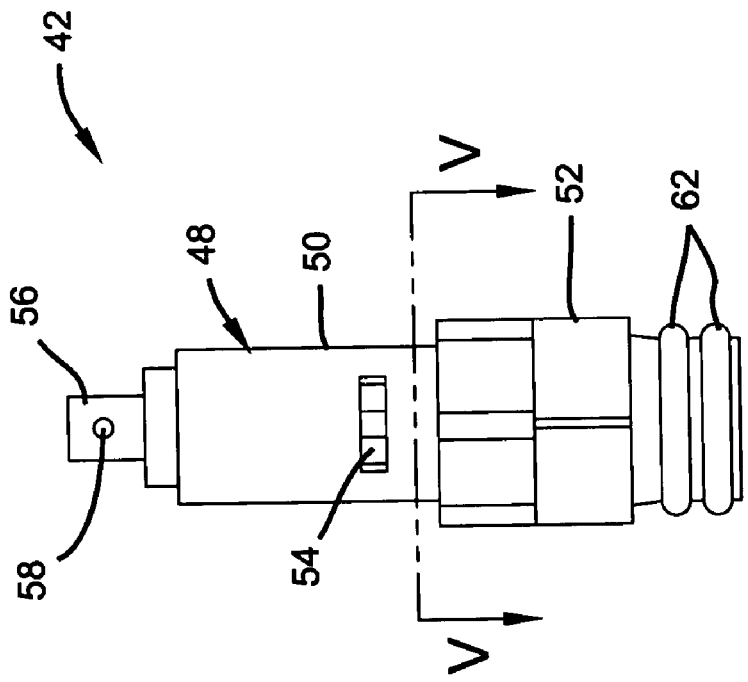
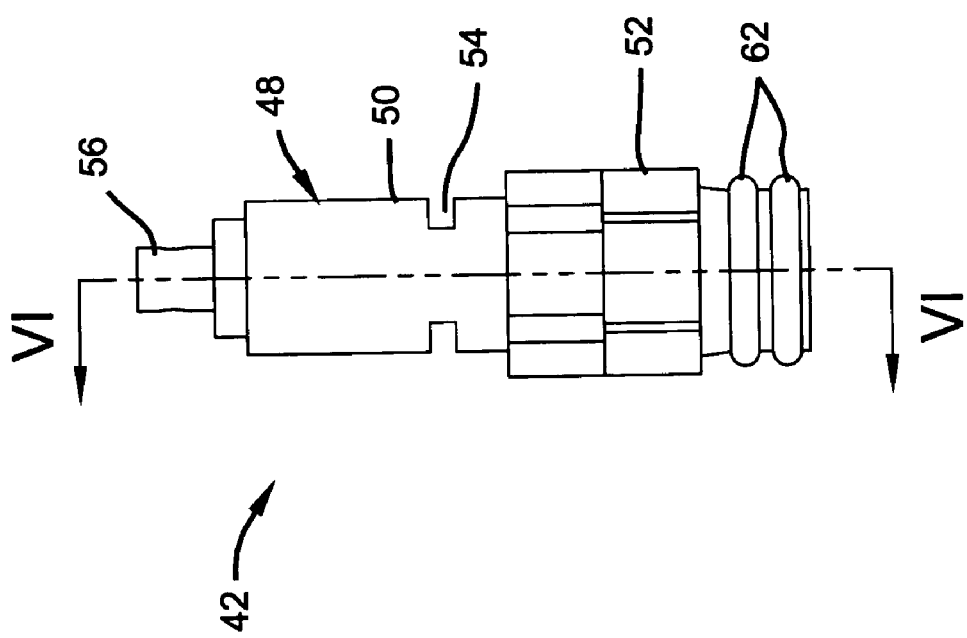

FROST FREE VALVE ASSEMBLY

FIELD OF THE INVENTION

The present invention relates to a valve assembly for use in residential or commercial plumbing systems. More particularly, the present invention relates to a frost free valve assembly that includes a ¼ turn valve.

BACKGROUND OF THE INVENTION

Frost free faucets have long been in existence. These faucets characteristically have a shut-off valve located in the end of an elongated pipe or sleeve located within the wall or a warmer interior area of the building of which the wall is a part. This shut-off valve is operated by an elongated rod connected to an exterior handle. The frost free characteristics of the faucet are caused by the shut-off valve shutting off the flow of water at a point within the wall or building with the residual water in the elongated pipe flowing by gravity outwardly through the conventional outlet drain of the faucet. In this manner, the valve may be used in sub-freezing climates without requiring seasonal draining.

Conventional frost free faucets, however, utilize a valve design that is subject to deterioration during the lifetime of the faucet due to impurities an element contained in the water design. The deterioration of the valve subjects the frost free faucet to backflow and leaks, which are undesirable. Furthermore, these conventional valve designs use of a multi-turn operation that is tiresome to operate.

It is desirable, therefore, to provide a frost free faucet that has an improved valve design. More particularly, it is desirable to provide a simple yet sophisticated valve design that enable an increased longevity, while maintaining sufficient backflow prevention. Furthermore, it is desirable to provide a valve design that allows ease of use.

SUMMARY OF THE INVENTION

With the above desirability in mind, the present invention provides a frost free faucet comprising a spigot assembly, a sleeve assembly including an elongated pipe, and a valve assembly. The valve assembly includes a ¼ turn valve and a check valve. The ¼ turn valve includes a rotatable disc with an inlet and a stationary disc with a through hole. Each disc of the ¼ turn valve is formed of a ceramic material, wherein upon turning the rotatable disc 90 degrees in a first direction, the inlet and the through-hole are aligned to an open position and upon turning the rotatable disc 90 degrees in a second direction, the inlet and the through-hole are misaligned to a closed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3A and FIG. 3B are front side views of a valve cartridge for use in the frost free faucet assembly;

DETAILED DESCRIPTION OF THE PREFERRED EMBODIMENT

The following description of the preferred embodiment is merely exemplary in nature and is in no way intended to limit the invention, its application, or uses.

Figure 1:
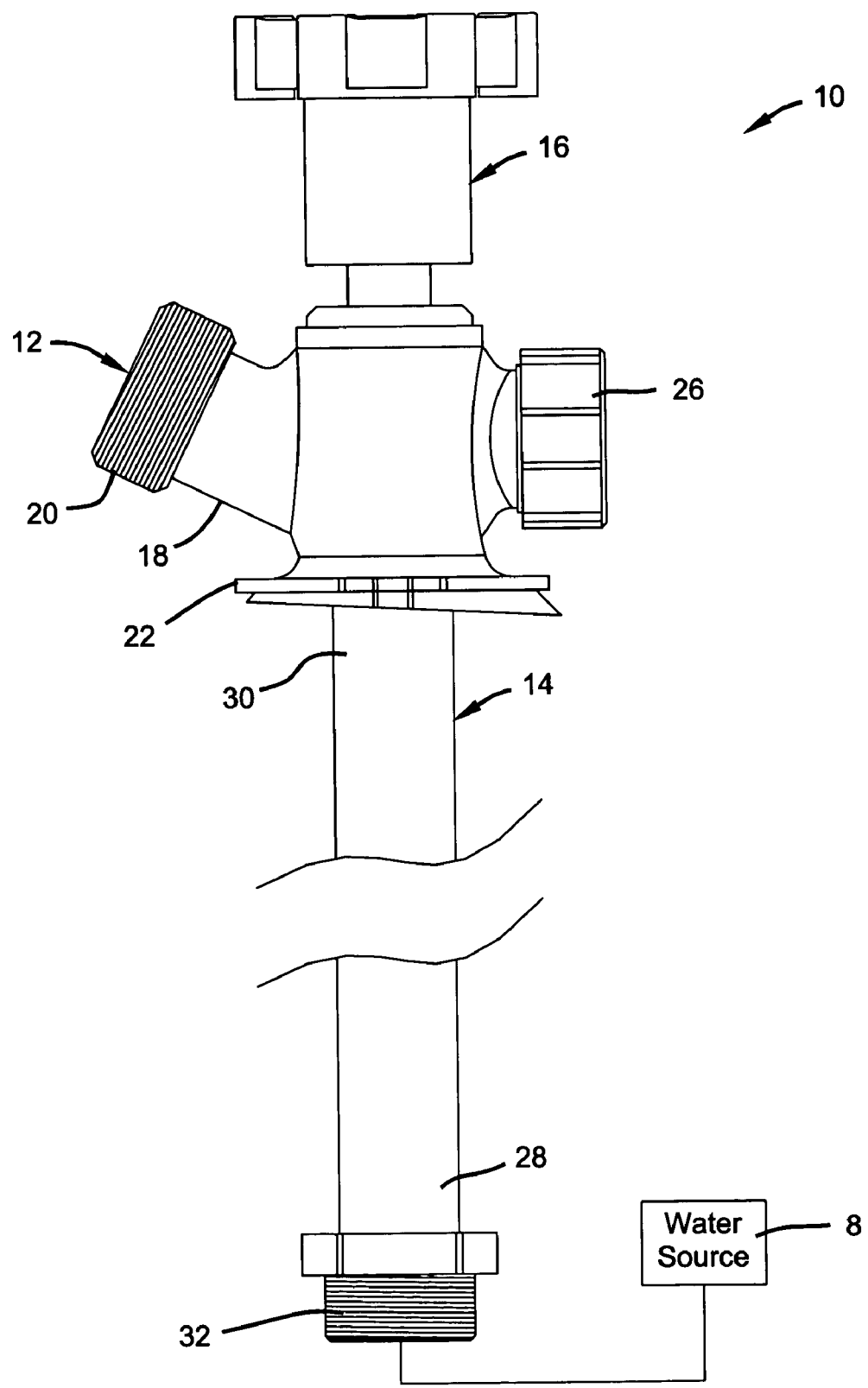
FIG. 1 is a side view of a frost free faucet assembly according to the present invention.

With reference to FIG. 1, the frost free faucet 10 includes a sill-cock or spigot assembly 12 coupled to a sleeve assembly 14. The spigot assembly 12 is further coupled to a handle assembly 16.

The spigot assembly 12 is a hollow, monolithic structure that is preferably cast of stainless steel or any other material known to one skilled in the art that is durable and can withstand extreme weather conditions. The spigot assembly 12 includes a drain conduit 18 with a threaded portion 20 for receiving a hose or any other device one may desire to attach to the frost free faucet assembly 10. The spigot assembly 12 also includes a flange member 22. The flange member 22 is used to secure the spigot assembly 12 to a wall or other barrier to which the frost free faucet assembly 10 is attached. Furthermore, the spigot assembly 12 includes a poppet housing 24 (FIG. 2) covered by a threaded cap 26. The poppet housing 24 encloses a poppet assembly 25 and o-ring 27 that functions as a vacuum breaker in accordance with ASSI standard in accordance with the applicable ASSI standards.

The sleeve assembly 14 is a hollow pipe having an upstream portion 28 and a downstream portion 30. The downstream portion 30 is in fluid communication with the spigot assembly 12 and is secured to the spigot assembly 12 by welding, soldering, sweating, brazing, or the like. The upstream portion 28 includes threaded portion 32 so that the frost free faucet assembly can be connected to an inlet pipe (not shown) located within a structure such as a building. Alternatively, the upstream portion 28 may be adapted to fluidly couple to the inlet pipe by other conventional means.

The sleeve assembly 14 is preferably 8 to 24 inches in length, more preferably 10 to 18 inches in length, most preferably 12 to 16 inches in length (NOTE: Please confirm these values). It should be understood, however, that the sleeve assembly 14 can be any length as long as a valve assembly 24 (shown in FIG. 2), located within the upstream 28 portion of the sleeve assembly 14, is located well within the wall or barrier of the dwelling so that the valve assembly is subjected to warmer temperatures so not to freeze. Such a design also prevents water or any other residual fluid that does not drain from the spigot assembly 12 and sleeve assembly 14 of frost free faucet 10 from freezing.

Figure 2:
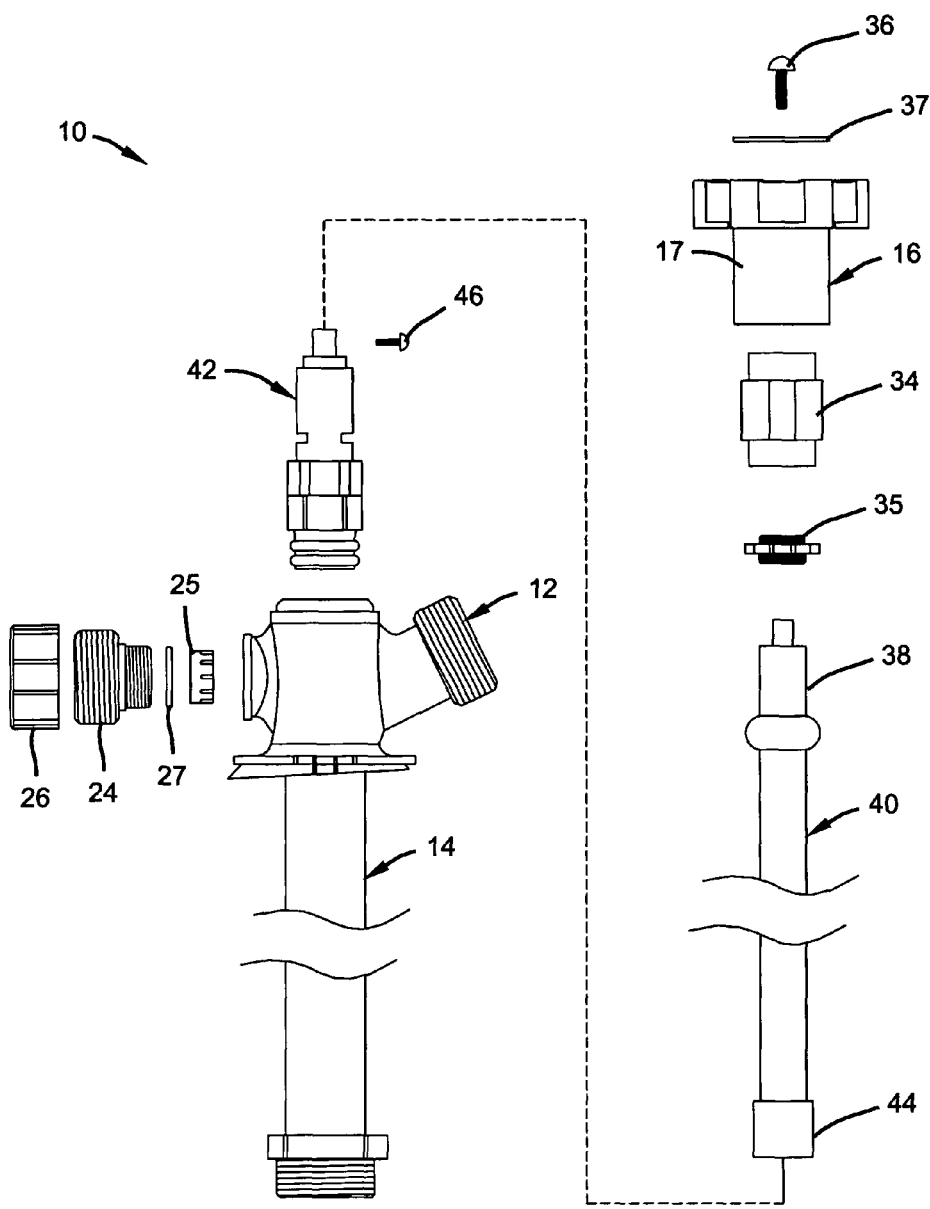
FIG. 2 is an exploded side view of the frost free faucet assembly shown in FIG. 1.

The handle assembly 16 may be any type of handle known in the art. It may be formed from metal, plastic, or any other material that is durable and is suitably strong to enable longevity in use of the frost free faucet assembly 10. As can be seen in FIG. 2, the handle assembly 16 comprises, and is connected to, a packing nut 34. A fastener 36 such as a screw, rivet, or the like is used to secure a name plate 37 and a handle 17 to the packing nut 34. The packing nut 34 secures the handle assembly 16 to the spigot assembly 12 and prevents water from leaking from the handle assembly 16 by way of a packing 35 that is formed of rubber, plastic, or other suitable sealing material. The packing nut 34 is a cylindrical piece and is hollow so as to receive an actuation portion 38 of a valve stem 40.

The valve stem 40 is located within the frost free faucet assembly 10, and more particularly, within the sleeve assembly 14 and spigot assembly 12. As the handle assembly 16 is connected to the packing nut 34, when the handle 17 is turned to an "on" or "off" position, an actuation portion 38 of the valve stem 40, and thus the entire valve stem 40, is also turned within the sleeve assembly 14 to actuate the valve assembly 42. The valve stem 40, in addition to the actuation portion 38, further includes a valve connection portion 44 that is used to connect the valve stem 40 to the valve assembly 42. The valve assembly 42 is secured to the valve connection portion 44 of the valve stem 40 by a fastener 46 such as a screw, rivet, or the like. The valve stem 40 and valve assembly 42 fit within the sleeve assembly 14.

Figure 4:
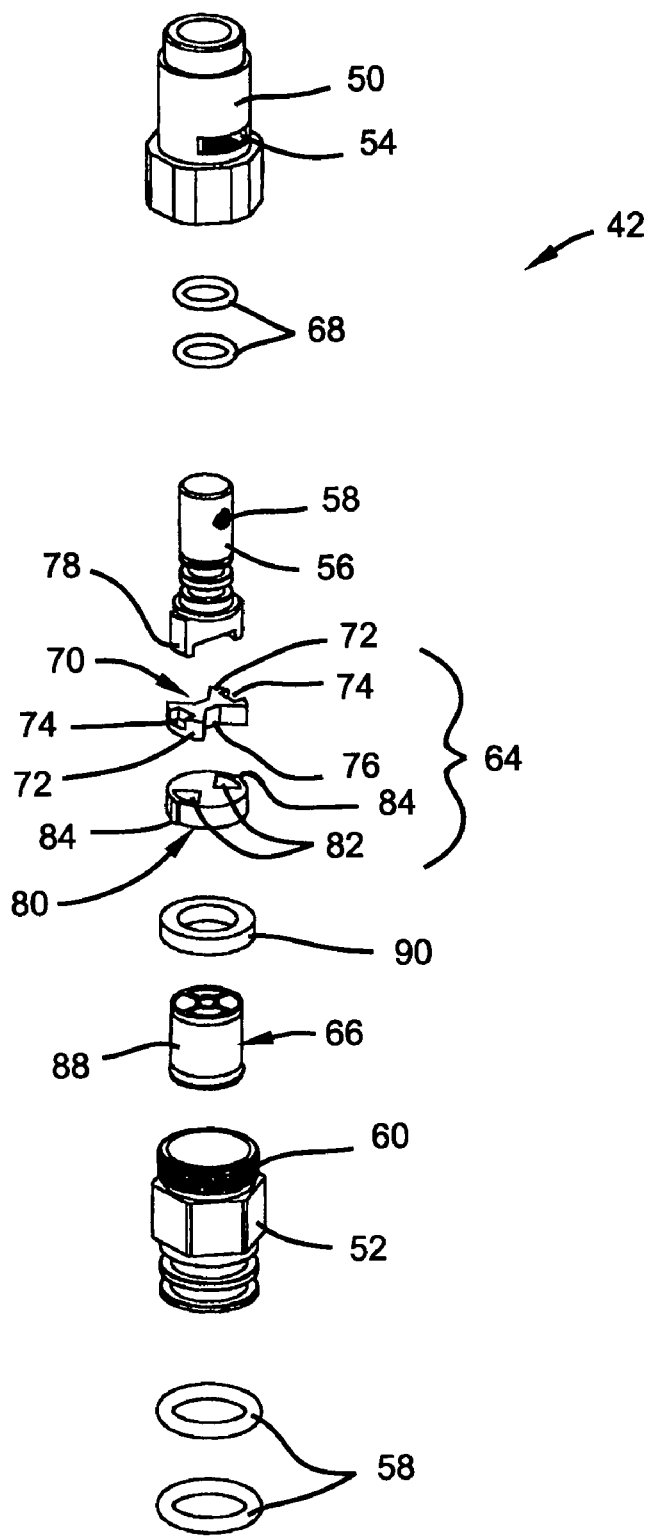
FIG. 4 is an exploded perspective view of the valve cartridge for use in the frost free faucet assembly shown in FIGS. 3A and 3B.

Now referring to FIGS. 3A, 3B, and 4, the valve assembly 42 will be described. As can be seen in FIGS. 3A and 3B, the valve assembly 42 is formed of a housing or cartridge 48 that includes a shell member 50 and a seat member 52. The shell member 50 is a cylindrical, hollow member that includes radial outlet ports 54. Preferably, the shell member 50 is comprised of brass or any other suitable material that will not degrade during the lifetime of the frost free faucet assembly 10. More preferably, the shell member 50 is formed of a material that will not chemically react with any elements that may be present in the water or fluid for which the valve conducts. The outlet ports 54 allow the water or any other fluid for which the valve is used to exit the valve cartridge 48 and travel downstream towards the spigot assembly 12. Also included in the cartridge 48 is an armature 56 that fits and is rotatably supported within the shell member 50. The armature 56 is essentially an extension of the valve stem 40 that extends into the cartridge 48. The armature 56 is preferably formed of brass and includes a hole 58 for accepting the fastener 46 such as screw, rivet, or the like for securing the valve assembly 42 to the valve connection portion 44 of the valve stem 40.

The seat member 52 is engaged with the shell member 50, and is a hollow, cylindrical shaped member. The seat member 52 is also preferably formed of brass. As with the shell member 50, the seat member 52 is also preferably formed of any other suitable material that will not degrade during the lifetime of the frost free faucet assembly 10 or chemically react with elements in the water or fluid. The seat member 52 includes a threaded portion 60 (FIG. 4) used to releasably secure the seat member 52 with the shell member 50. The seat member 52 may also include o-rings 62. Although two o-rings 62 are shown in Figures, it should be understood that o-rings 62 are not required for the operation of the present invention. It is preferable, however, to include at least one o-ring 62 for further preventing any leaks from developing in the frost free faucet assembly 10.

Now referring to FIG. 4, the components of the cartridge 48 contained within the shell and seat members 50 and 52 will now be described. The cartridge 48, in addition to the shell member 50, seat member 52, and armature 56 includes a valve member 64 and a check valve 66. The valve member 64 is disposed upstream and engaged with the armature 56 within the shell member 50. Another pair of o-rings 68 provide a seal between the armature 56 and the shell member 50. Although two o-rings 68 are shown the figure, it should be understood that a single o-ring 68 is sufficient to provide an effective seal between the armature 56 and the shell member 50.

The valve member 64 is a ¼ turn valve member having two valve elements 70 and 80. A rotatable element 70 is preferably a butterfly-shaped disc defined by two flanges 72 having recesses 74 formed therein. One skilled in the art, however, will recognize that the shape of rotatable element 70 may vary such as an element shape similar to stationary disc 80 or otherwise. The rotatable element or disc 70 further includes inlets 76 disposed adjacent the flanges 72. The recesses 74 of the rotatable element 70 engage with prongs 78 of the armature 56. The second element 80 of the valve member 64, is a stationary disc 80 having two through-holes 82. The stationary disc 80 includes a pair of bar members 84 that extend outward from the circumference of the stationary disc 80 and engage with indentations (not shown) located on an interior surface of the shell member 50. The bar members 84 engage the shell member 50 to prevent rotation therein. The through-holes 82 of the stationary disc 80 coordinate with the inlets 76 of the rotatable disc 70 when the valve stem 40, armature 56, and thus the rotatable disc 70, are turned 90° relative to the stationary disc 80. The rotatable disc 70 is prevented from turning greater than 90° by stop members 86 (FIGS. 5A and 5B) that are formed on the interior surface of the shell member 50. More particularly, the stop members 86 prevent the prongs 78 of armature 56 from turning greater than 90° within the shell member 50.

The discs 70, 80 of the valve member 64 are preferably fabricated of a ceramic material. The use of a ceramic material is advantageous in that it is a relatively inert and strong material. As such, the discs will not degrade over time due to elements that may be contained in the water or fluid that travels through the valve assembly 42. Furthermore, the ceramic material is scratch-resistant and prevents the discs from becoming damaged throughout the life of the frost free faucet 10. Although it is preferable to use a ceramic material in the present invention, it should be understood that the present invention contemplates the use of other materials. For example, the discs can be formed of a high-strength polymer, brass, stainless steel, or any other suitable material.

The check valve 66 is preferably a polymeric material or plastic such as polypropylene, polystyrene, or polyethylene and is disposed upstream of the valve member 64 (i.e., between the water source 8 and the valve member 64) within the seat member 52 of the cartridge 48. The check valve 66 includes a cylindrical member 88 and is separated from the valve member 64 by a washer 90 that is preferably formed from silicone or rubber. The check valve 66 further includes a spring 92 and a plunger 94 (shown in FIGS. 6A and 6B) that are actuated by the flow of water. An o-ring 95 surrounds the plunger 94 to prevent leaks when the plunger 94 and frost free faucet 10 are in a closed position. The check valve 66 is utilized for anti-siphoning and alleviating back pressure. In preventing siphoning, the check valve 66 prevents water from flowing back through the valve assembly 42 and re-entering the water supply of the inlet pipe located within the building when a negative pressure differential exists across the plunger 94. As such, it is beneficial that the check valve 66 be placed upstream of the valve member 64.

Figure 5B:
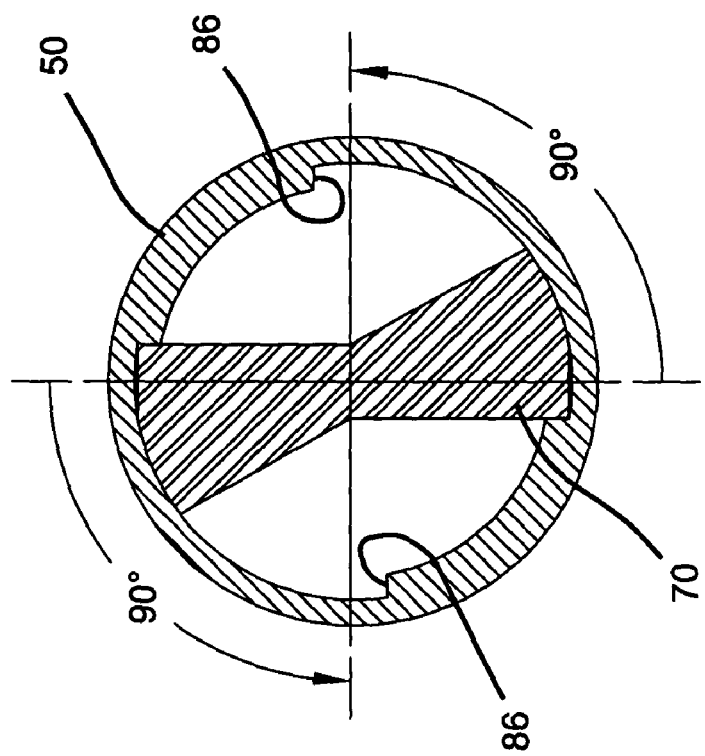
FIG. 5A and FIG. 5B are cross-sectional views the ¼ turn operation of the valve assembly taken through the line V—V shown in FIG. 3B.
Figure 5A:
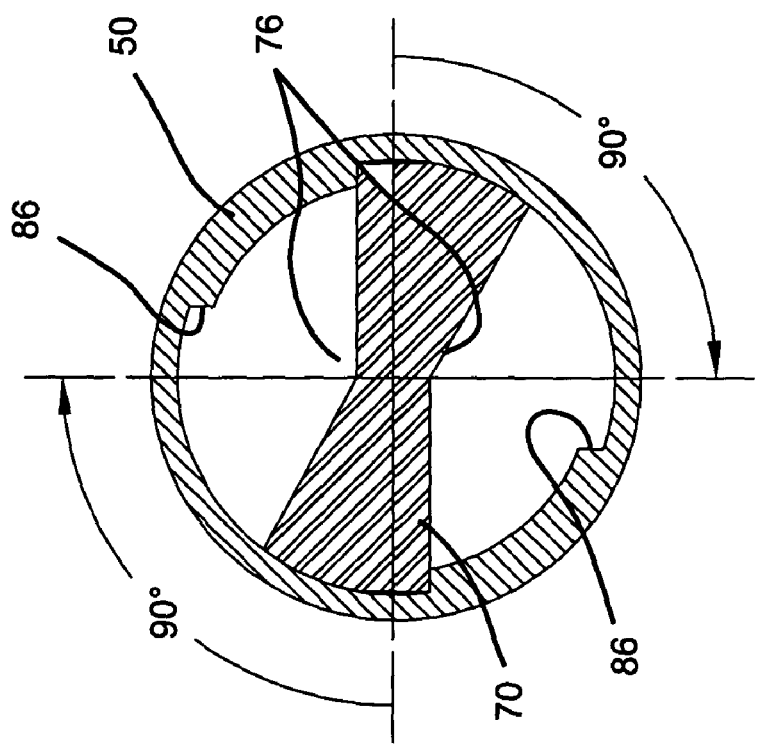

Operation of the frost-free faucet assembly 10 according to the present invention will now be described. In order to open the valve assembly 42, the handle 17 is turned in a first direction. As the valve member 64 is a ¼ valve, the handle 17 only undergoes a 90° of rotation to turn the valve member 64 to an open position. The handle 17 actuates the valve stem 40 and armature 56 to rotate the rotatable disc 70 of the valve member 64 a ¼ turn or 90°. This ¼ turn operation of the valve member 64 is shown in FIGS. 5A and 5B. When the rotatable disc 70 is rotated 90°, the inlets 76 of the rotatable disc 70 align with the through-holes 82 of the stationary disc 80 and allow water to flow through.

Figure 6A:
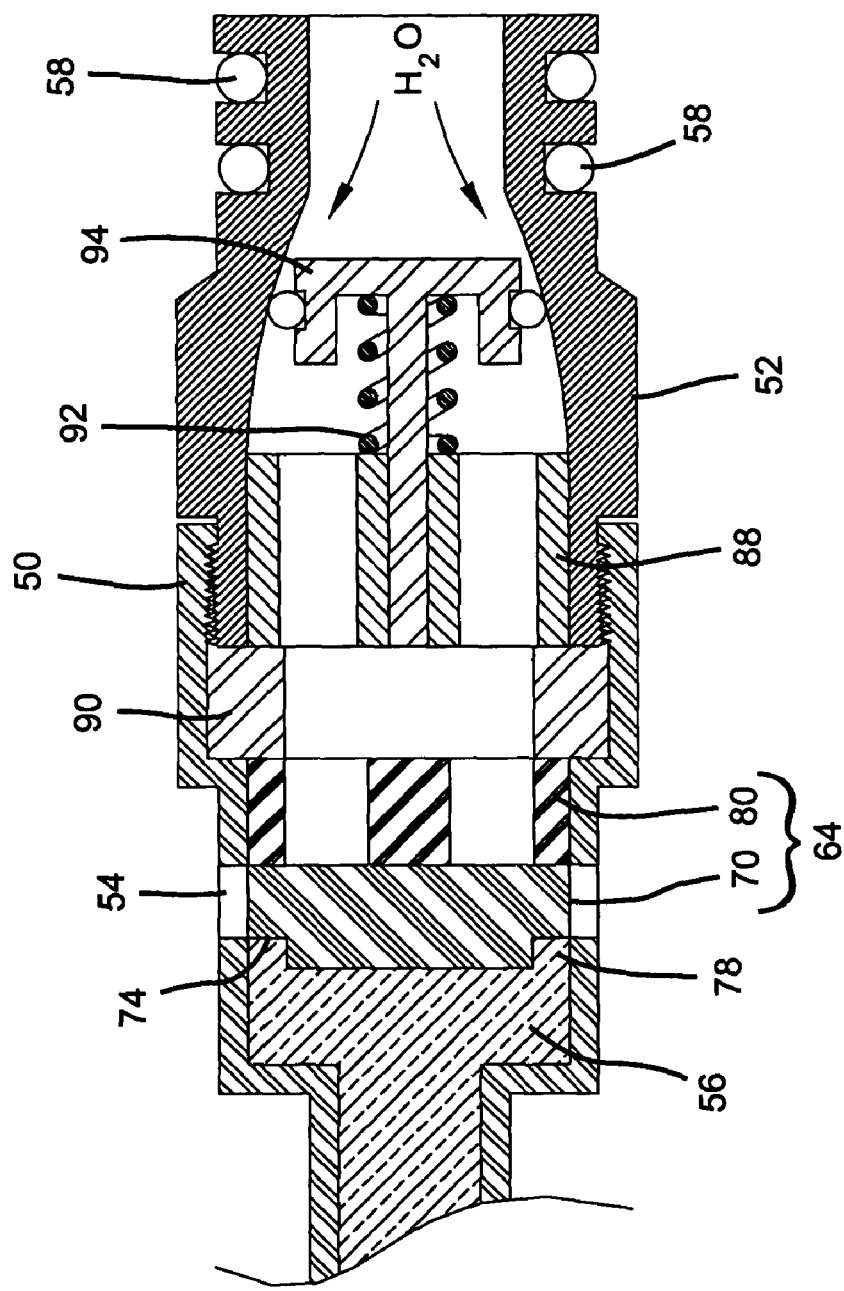
FIGS. 6A and 6B are a cross-sectionals view of the valve cartridge taken through line VI—VI shown in FIG. 3A

When the inlets 76 of the rotatable disc 70 are aligned with the through-holes 82, a positive pressure differential exists across the plunger 94. This positive pressure differential compresses the spring toward the cylindrical member 88 and actuates the plunger 94 to an open position (FIG. 6A). When the plunger 94 is in an open position the pressurized water from a water source 8 such as an inlet pipe located within the building is allowed to travel towards and through the check valve 66. The check valve 66 is preferably designed to accommodate water pressure of 120 psi or less, for use in residential or commercial applications. It should be understood, however, that the valve design of the present invention may be modified so that higher water pressures may be accommodated. More particularly, the components of the cartridge 48, valve member 64, and check valve 66 can be enlarged or strengthened to accommodate higher pressures.

The pressurized water travels through the open check valve 66 towards the ¼ turn valve member 64. The water flows through the aligned through-holes 82 and inlets 76 of the discs 70 and 80 and enters into the shell member 50 of the cartridge 48. The water then exits the shell member 50 of the cartridge 48 through the outlet ports 54 and enters the sleeve assembly 14. The water then flows around the valve stem 40 and through the sleeve member 14 downstream towards the spigot assembly 12 and exits from the drain conduit 20.

Figure 6B:
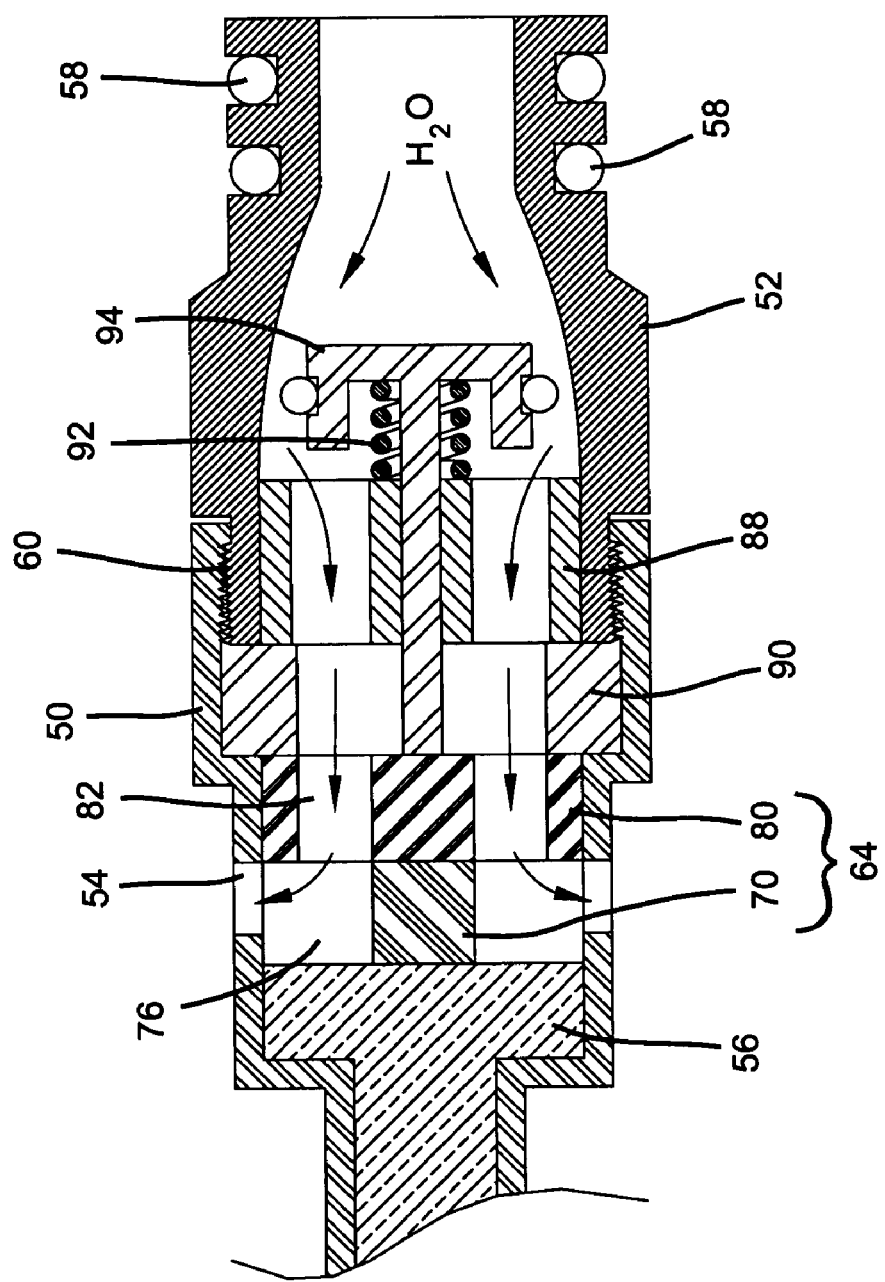

In order to close the valve assembly 42, and turn the frost free faucet 10 off, the handle 17 is turned a ¼ turn in a second and opposite direction. The handle 17 again actuates the valve stem 40 and armature 56 to rotate the rotatable disc 70 90° to a closed position. Referring to FIG. 6B, it can be seen that the inlets 76 of the rotatable disc 70 and the through-holes 82 of the stationary disc 80 become misaligned and prevent water from flowing through the ¼ turn valve 64. A back pressure or negative pressure differential then exists between the valve assembly 42 and the water source 8. This negative pressure differential allows the spring 92 to decompress which causes the plunger 94 of check valve 66 to "check" into a closed position and prevents the water still downstream of the valve cartridge 48 from siphoning back into the inlet pipe.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A frost-free faucet comprising:
   a spigot disposed at a first end of an elongated pipe;
   a valve assembly disposed at a second end of said elongated pipe, said valve assembly including a valve member located within a housing, said housing including an inlet portion and an outlet portion, said inlet portion including a fluid inlet and said outlet portion including at least one radial outlet port, said valve member being rotatably positionable through 90 degrees between a closed position and an open position to selectively enable fluid communication from said inlet portion to said outlet portion, said valve member including a first valve element and a second valve element rotatably positionable with respect to said first valve element, said first valve element having a first passageway formed therein which aligns with a second passageway formed in said second valve element when said valve member is in said open position, said second valve element blocking said first passageway when said valve member is in said closed position;
   a check valve located in said housing between said inlet portion and said valve member to selectively disable fluid communication from said outlet portion to said inlet portion; and
   an operator including a handle disposed adjacent said spigot and a valve stem extending between said handle and said valve member such that said valve member is rotatably positionable by said operator;
   wherein when said valve member is in said open position, said second passageway aligns with said radial outlet port to define a fluid communication path through said first and second valve elements and said radial outlet port downstream along said valve stem toward said spigot.

2. The frost free faucet of claim 1, wherein said first valve element includes a first disc fixed within said valve housing and said second valve element includes a second disc rotatably positionable relative to said first disc within said valve housing.

3. The frost free faucet according to claim 2, wherein said valve assembly further includes a armature engaged with said valve assembly to rotate said second disc relative to said first disc.

4. The frost free faucet according to claim 3, wherein said second disc has a recess formed therein which receives a prong of said armature to rotably couple said armature and said second disc.

5. The frost free faucet according to claim 3, wherein said armature is engaged with a valve stem, said valve stem driven by a handle.

6. The frost free faucet according to claim 2, wherein said housing includes a stop member to prevent said second disc from rotating greater than 90 degrees.

7. The frost free faucet according to claim 2, wherein said second disc is butterfly-shaped and said first disc is round.

8. The frost free faucet according to claim 1, wherein said check valve further comprises a plunger having a seal formed thereon, said plunger being slidably positionable within said housing between a first position disabling fluid communication between said outlet and said inlet and a second position enabling fluid communication between said inlet and said outlet.

9. The frost free faucet according to claim 8, wherein said check valve further comprises a spring for allowing said plunger to move between said first position disabling fluid communication between said outlet and said inlet and said second position enabling fluid communication between said inlet and said outlet.

* * * * *

UNITED STATES PATENT AND TRADEMARK OFFICE
CERTIFICATE OF CORRECTION

PATENT NO. : 6,880,573 B2
DATED : April 19, 2005
INVENTOR(S) : Peter Berkman et al.

It is certified that error appears in the above-identified patent and that said Letters Patent is hereby corrected as shown below:

Column 1,
Line 26, after "impurities" insert -- in --;
Line 29, after "use" delete "of";

Column 2,
Line 8, after "views" insert -- of --;
Line 11, "a cross-sectionals view" should be -- cross-sectional views --;
Line 12, after "3A" insert -- . --

Signed and Sealed this

Twelfth Day of July, 2005

JON W. DUDAS
*Director of the United States Patent and Trademark Office*